GERARD CURRIE
INVENTOR

Aug. 18, 1964 G. CURRIE 3,145,380
SIGNALLING SYSTEM
Filed Oct. 24, 1958 2 Sheets-Sheet 2
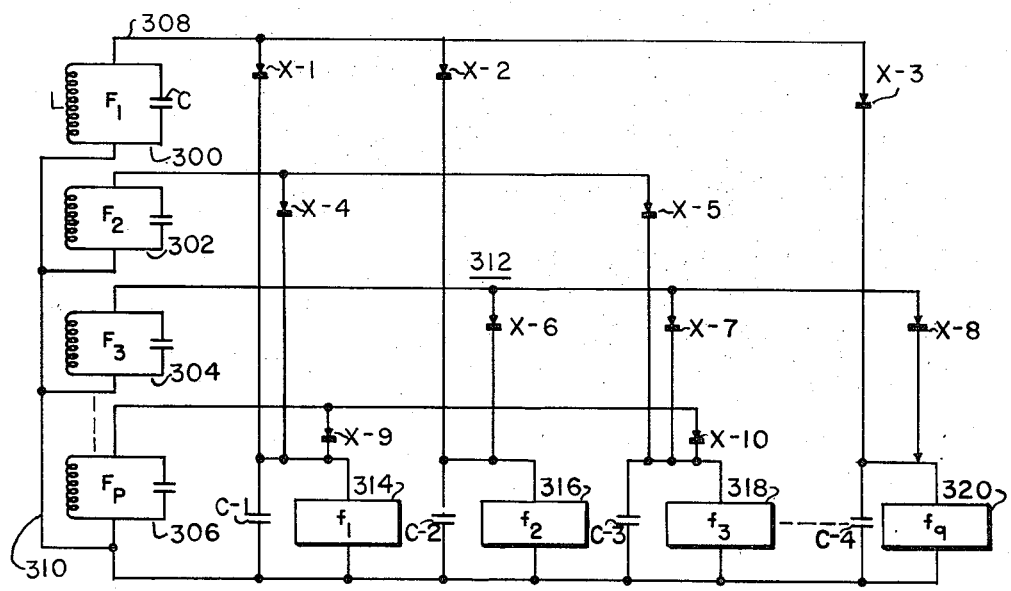
FIG. 2 a
FIG. 2 b
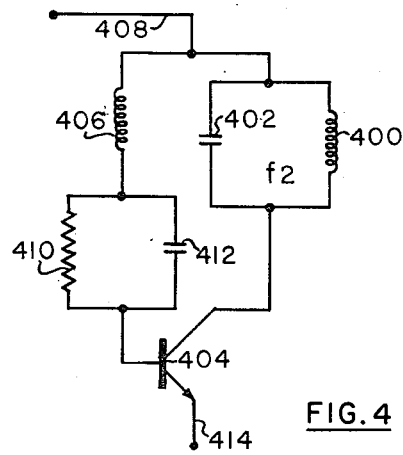
FIG. 4
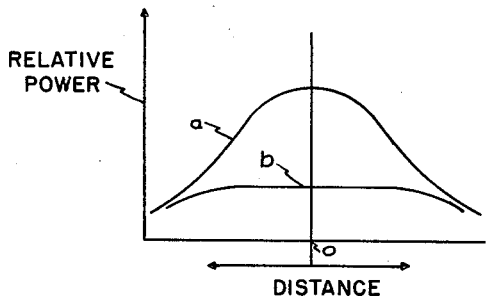
FIG. 3
GERARD CURRIE
INVENTOR
BY Harvey S. Lowhurst
ATTORNEY 3,145,380
SIGNALLING SYSTEM
Gerard Currie, Santa Clara, Calif., assignor to General
Precision, Inc., a corporation of Delaware
Filed Oct. 24, 1958, Ser. No. 769,406
16 Claims. (Cl. 343—6.5)

This invention relates to electrical signalling systems, and more particularly to apparatus for identifying the location of a first object with respect to one or more of a plurality of second objects. The invention may be utilized for a variety of different purposes, a number of which will be mentioned below.

In the transportation and materials handling fields in general, and particularly in the efficient operation of a railroad, it often becomes desirable to have information such as where each train is at any time, or with what velocity the train is moving, or where individual railroad cars are located. Sometimes it is of great advantage to determine the location of selected goods or materials carried on railroad vehicles, aircraft, trucks or conveyers.

A considerable saving may often be effected if a central agency is apprised, at all times, of selected portions of the above information, since the railroad and trucking businesses involve long distances covering a large territory, usually without communication equipment readily available. For example, scheduling of trains may be considerably simplified by remotely observing the density of traffic at crowded switching points. Information regarding the location and identity of available railroad vehicles stored on sidings is immensely useful in determining the type and amount of freight space available at any loading centers. Information on the instantaneous location of particular goods, such as raw materials or cattle shipped across country on separate trains or trucks, may help the recipient to forecast time of arrival so that necessary arrangements for unloading, storing or the like may be made.

Automatic identification of air-borne aircraft, either manned or unmanned, may provide reliable data for numerous uses, among which are the assignment of optimum routes or automatic scheduling of incoming traffic by means of auxiliary computers. Also such a signalling system may be adopted to control traffic flow during landing and take-offs. Other uses may be envisioned such as the identification of persons who may enter an authorized area. In such applications, the signalling system of this invention takes the place of an identification card or a key by either acting in a preventative or permissive fashion.

Referring now more specifically to the railroad business, it has heretofore been suggested that radio links be established between each engine or train and a central agency in order that the operators be able to inform the central agency of their location. While such systems have been quite useful, their effectiveness has been limited by the fact that each train operator must be relied upon always to furnish accurate information with regard to the location of his train. Additional, the location of selected special purpose equipment, such as refrigerator cars or heavy-duty freight cars, may require further radio links or teletype equipment situated proximate to such coupling points and be operated by railroad yard personnel, since the train operator usually does not have the means or responsibility to keep track of the identity of the individual cars on his train.

The need for an automatic signalling system for furnishing accurate information with regard to train or truck location or goods identification to a central agency has long been recognized, and various systems have been proposed. As far as is known, none have been very successful, except the system disclosed in application Serial Number 715,899, filed February 18, 1958, by Clarence S. Jones for "Signalling System" and henceforth referred to as the "Jones System" and the system disclosed in application Serial No. 747,669, filed July 10, 1958, now Patent No. 2,910,579, by Clarence S. Jones and Gerard Currie for "Signalling System" and henceforth called the "Jones-Currie System." Both of these applications are assigned to the same assignee as the present invention.

The specific system disclosed in detail in application Serial No. 715,899 as the "Jones System" may be said to comprise an interrogator-responder system wherein one or more interrogators are capable of relative motion with respect to one or more responders. The interrogator is operative to develop a sequence of interrogator signals of different frequencies and of short time duration which are cyclically repeated. The responder is provided with a frequency selective coupling means responsive to selected interrogator signals from the interrogator. As the interrogator approaches the responder sufficiently close to strongly couple therewith, those of the sequence of interrogator signals whose frequencies correspond to the frequencies of the selected interrogator signals excite the coupling means to operate a transistorized responder signal oscillator which transmits a responder or return signal at further frequency.

For an interrogator signal having a frequency which does not correspond to one of the selected interrogator signals, no responder signal is furnished because the coupling means in the responder is not excited, and therefore it is unable to furnish power to the responder signal oscillator. A particular responder may be identified by noting which ones of the sequence of pulsed interrogator signals from the interrogator produce a responder signal.

By selective use of different frequency selective coupling means in different responders, the responder signal oscillator will provide a different successive pulse coded signal from the sequence of interrogator signals for reception by a receiver associated with the interrogator. The successive pulse coded signal is therefore characteristic of a responder and may identify the same uniquely by reducing the successive pulse coded signal to the form of a binary number. The number of possible different frequency selective coupling means for a given sequence of interrogator signals determines the maximum number of different responders which may be uniquely identified. As is well known to those skilled in the art, if $p$ different frequencies are successively transmitted by the interrogator, the maximum number of different successive pulse coded signals obtainable is equal to $2^p$. Therefore $2^p$ different responders can be utilized neglecting the fact that a responder which provides no response signal is not really identified.

The specific system disclosed in detail in Patent Number 2,910,579 as the "Jones-Currie System" likewise comprises an interrogator-responder system wherein one or more interrogators are capable of relative motion with respect to one or more responders. However, the interrogator of the "Jones-Currie System," instead of providing a discontinuous sequence of interrogator signals of different frequencies, is operative to develop a continuous interrogator signal of a single frequency. The responder of the "Jones-Currie System" is provided with a coupling means responsive to the single frequency interrogator signal, and includes a selected plurality of responder oscillators, each adopted to provide a responder signal of a different frequency. As the interrogator approaches the responders sufficiently close to strongly couple therewith, the single frequency interrogator signal from the interrogator excites the coupling means, which thereupon furnishes power to operate the selected responder signal oscillators. Each oscillator developes, in response thereto, a responder or return signal at its own frequency. A particular responder may therefore be identified by noting the various frequencies which are simultaneously developed.

By selective use of different responder oscillators in different responders, each responder will provide a simultaneous pulse coded signal including a different plurality of selected responder signals of different frequencies for reception by a receiver associated with the interrogator. The simultaneous pulse coded signal is therefore characteristic of a responder and may identify the same uniquely by reducing the simultaneous pulse coded signal to the form of a binary digit. The number of different combinations of different responder signal oscillators determines the maximum number of different responders which may be uniquely identified. As is well known, if $q$ different responder oscillators are available, the maximum number of different simultaneously pulse coded signals obtainable is equal to $2^q$. Therefore $2^q$ different responders may be utilized neglecting again the fact that a responder which provides no responder signal is not really identified.

Both the "Jones System" and the "Jones-Currie System" offer extreme advantages over prior systems, in that both systems use purely passive responders which respond (provide pulse coded signals) automatically whenever interrogated, without being inaccurate or unreliable. Consequently numerous remote stations, locations, vehicles, goods, persons, etc. may be provided with responders without attendant provisions of electrical batteries or wired power sources. While passive responder means, such as reflectors, have heretofore been provided elsewhere, all of these of which I am aware, require precise physical alignment and exposed areas, and are adversely effected by various environmental factors.

While both the "Jones System" and the "Jones-Currie System" admirably accomplish their purpose, and while both systems are ideally suited for a wide variety of applications, each system has certain characteristics making it especially desirable for certain classes of applications. And, while each system is ideally suited for those certain classes of applications, there are still further classes of applications which would benefit from a modification of either of the "Jones" or "Jones-Currie" systems.

For example, the specific interrogator disclosed in detail in the "Jones System" develops a sequence of interrogator signals for coding purposes, each of a different frequency, with an additional interrogator signal of a further frequency for automatic gain control purposes interposed between each of the interrogator signals. If a large number of differently coded responders is to be identified, so that the system is required to employ a relatively large binary number, a large number $p$ of different interrogator signals for coding purposes must be developed. This requirement may be troublesome when the system is applied to the identification of very rapidly moving objects or the identification of the location of an object which moves rapidly with respect to a plurality of fixed locations.

In order to allow the use of economical circuitry and still preserve the system's reliability, the time length of each interrogator signal must be maintained at or above a minimum value. In the case of rapidly moving bodies, the interrogator transmit means and responder pick-up means may remain sufficiently close to one another for such a short time that an insufficient number of interrogator signals are coupled to the responder if each frequency is allotted its required duration. The present invention is in some respects an improvement over the "Jones System" in that it overcomes this described limitation by interrogating with each successive interrogator signal a plurality of binary digits simultaneously and utilizing a substantially smaller number $p$ of different interrogator signals in the sequence without sacrificing the maximum number of responders which can be uniquely identified. In other words, the present invention utilizes a smaller number of integer signals in the sequence without sacrificing the number of responders which may be uniquely identified.

The specific responder disclosed in detail in the "Jones-Currie System" couples to a continuous interrogator signal of a single frequency when sufficiently close to the interrogator and consequently does not exhibit the limitation described in connection with the "Jones System" caused by the requirement of a large value of $p$. The time duration during which both the interrogator and responder are within the minimum distance necessary for strong coupling from one to the other may now be very short since the responder receives a continuous interrogator signal. The lack of successive interrogator signals, each of which requires a minimum allotment of time, makes the "Jones-Currie System" ideally suited for fast moving objects.

If a large number of responders are to be uniquely identified in the signalling system, the "Jones-Currie System" requires the employment of a large number, $q$, of response signal oscillators in many of the responders. The number must be large enough so that $2^q$ is equal to the required number of responders to be uniquely identifiable. This requirement may be troublesome because each responder signal oscillator requires power at or above a minimum level and all responder signal oscillators are powered simultaneously by the response actuating signal derived from a single interrogator signal. It is therefore seen that the available power, at least to some extent, determines the maximum number $q$ of response signal oscillators which may be utilized in the "Jones-Currie System." The present invention is in some respects an improvement over the "Jones-Currie System" in that it overcomes the described limitation due to limited available power in that each interrogator signal will not power more than $q$ responder oscillators and where $q$ is a substantially smaller number, and often a number much less than $q$.

In addition to the speed limitation inherent in the "Jones System" due to the required minimum allotment of time of each of the successive interrogator signals and the power limitation inherent in the "Jones-Currie System" due to the required minimum power level of each of various responder signal oscillators, each of the signalling systems described has certain other advantages over the other. For example, the interrogator of the "Jones-Currie System" is less complex than the interrogator of the "Jones System," a feature which is always desirable from a cost and reliability viewpoint. On the other hand, the responder of the "Jones System" is less complex than the responder of the "Jones-Currie System" since the former is provided with only a single response oscillator. The present invention provides a signalling system wherein the interrogator is less complex than the interrogator of the "Jones System" and wherein the responder is less complex than the responder of the "Jones-Currie System" for a binary code output having the same number of digits. In fact, the present invention permits, within certain limits, the choice of complexity of one unit at the expense of the other.

It is therefore an object of this invention to provide an improved signalling system for automatically identifying, locating, or numbering a plurality of objects.

It is another object of this invention to provide an improved signalling system for automatically identifying, locating or numbering a much greater number of fast moving objects than has heretofore been possible.

It is another object of this invention to provide an improved signalling system in which each one of a sequence of interrogator signals actuates a parallel pulse coded response.

It is another object of this invention to provide an improved signalling system including a simplified interrogator and a simplified responder.

It is another object of this invention to provide an improved signalling system wherein a simplified interrogator interrogates a responder with $p$ successive interrogator signals of different frequencies and wherein a simplified responder responds to each interrogator signal with a composite responder signal including one or more responder signals of different frequencies and wherein each interrogator signal is associated with a particular composite code signal.

It is another object of this invention to provide an improved signalling system which is reliable in operation, simple in design and economical in construction.

Other objects of the invention will in part be obvious and will in part appear hereinafter.

In accordance with one embodiment of the signalling system of this invention, one or more interrogators are capable of relative motion with respect to one or more responders. The interrogator is operative to develop a sequence of interrogator signals of different frequencies and short time duration which are cyclically repeated. The responder is provided with a frequency selective coupling means including coupling elements, each of which is responsive to selected interrogator signals of a given frequency. As an interrogator and a responder approach one another close enough to couple sufficiently with one another, those of the interrogator signals whose frequencies correspond to the frequencies of the selected interrogator signals excite responsive coupling elements. Each excited coupling element furnishes power to operate a selected plurality of responder signal oscillators, each of which transmits a responder signal of a further different frequency.

For an interrogator signal having a frequency which does not correspond to one of the selected interrogator signals, no responder signals are furnished because no coupling element is excited to furnish power, or, no responder signal oscillators are coupled to this particular coupling element. A particular responder may be identified by noting which ones of the sequence of interrogator signals actuate a set of responder signals and the frequencies of the different responder signals in the set. In other words, the signalling system of this invention may provide as an output quanity a successive pulse coded signal wherein each pulse itself is a simultaneous pulse coded signal. The number of possible different frequency selective coupling means for a given sequence of interrogator signals determines the maximum number of different successive pulse coded signals obtainable. Further, the number of different combinations of responder signal oscillators determines the maximum of different simultaneous coded pulse signals. Since each pulse of the successive coded pulse signals can be made up of all possible parallel coded pulse signals, the total number of different coded pulse signals is tremendous.

If $p$ different interrogator signals are included in one sequence and a maximum of $q$ different responder signal oscillators may be utilized in one responder, the maximum number of responders which are capable of unique identification is equal to $2^{pq}$. It is therefore seen that even though $p$ and $q$ are kept small in comparison with the values for $p$ and $q$ necessary to provide the required digital number in the "Jones" and "Jones-Currie" systems, the number of digits obtainable with the signalling system of this invention is $pq$.

For a railroad signalling system, the interrogator may be mounted upon a moving vehicle whose location is to be determined at fixed intervals. The responders may be located at various intervals along a railroad track or roadbed over which the vehicle passes. In case of railroad tracks, the preferred position of each responder is the top or inside of a selected track tie. The location of and the distance between individual response blocks is largely a matter of choice determined by what particular points identification of location of the vehicle is made. As will be explained below, the number of response blocks which may be utilized throughout a whole railroad network are limited, at least to some extent, by the number of digits with which the signalling system is provided. As stated above, the respective position of the interrogator and responders may be exchanged so that the interrogator unit is fixed and each of the moving vehicles carries a response block. Such an arrangement is preferred when goods are moved by conveyer or the like over or past the interrogator, or when freight cars are to be classified upon entering or leaving a switchyard.

For a fuller understanding of the nature and objects of the invention reference should be had to the following detailed description taken in connection with the accompanying drawings, in which:

FIG. 2a is an electrical schematic diagram of an embodiment of passive responders which may be utilized with the signalling system illustrated in FIG. 1;

FIG. 2b, is a binary code diagram of the responder illustrated in FIG. 2a, and is included to aid in the explanation of the coding technique utilized in responders;

FIG. 3 is a graphical illustration useful in understanding the operation of the automatic gain control feature of this invention; and FIG. 4 is an electrical schematic diagram of a responder oscillator which may be utilized with the responder illustrated in FIG. 2a.

Figure 1:
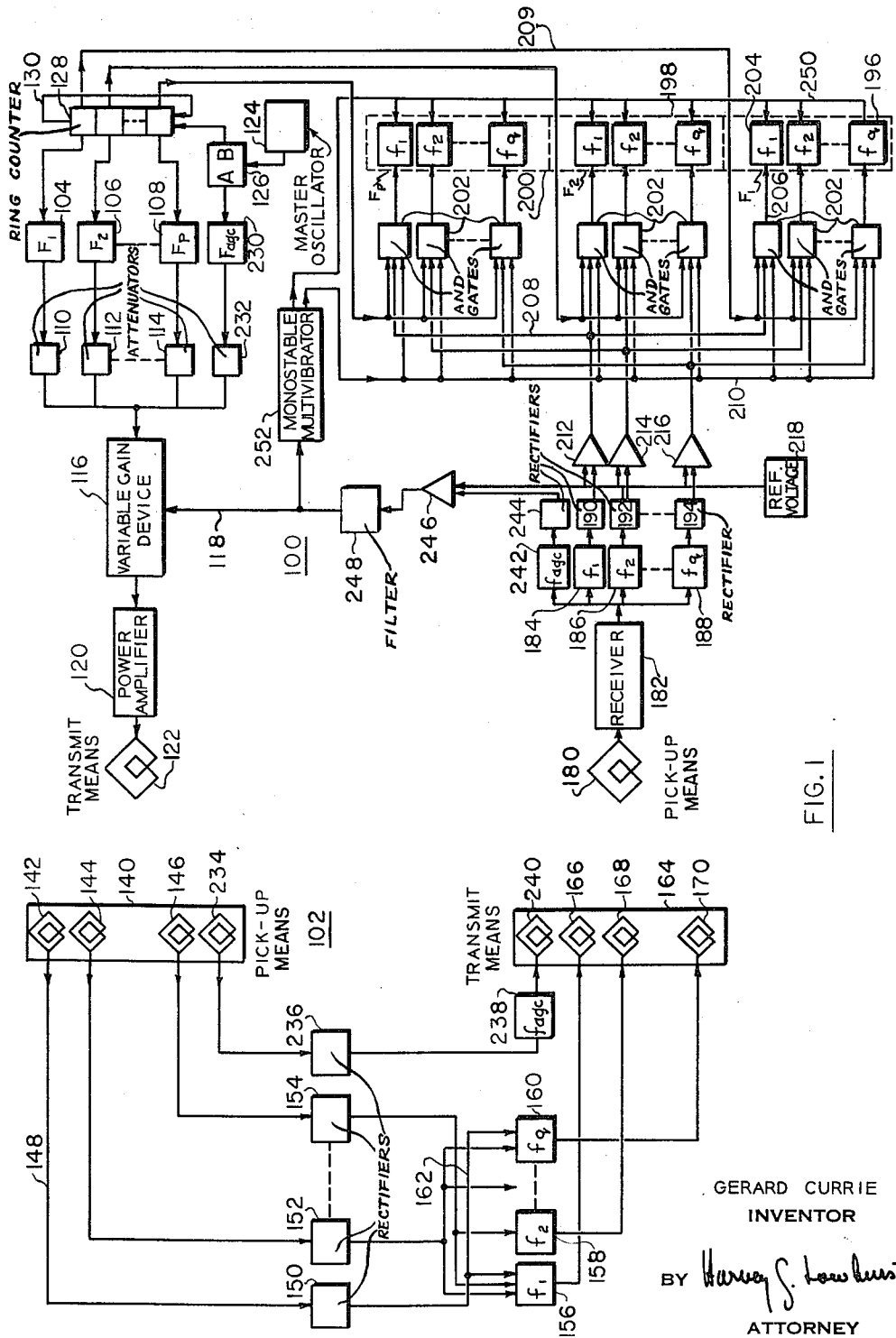
FIG. 1 is a schematic electrical block diagram illustrating one embodiment of the signalling system of this invention as it might be used in connection with an automatic railroad data transmission system.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only and are not intended as a definition of the limits of the invention.

Referring now to the drawings, and particularly to FIG. 1 thereof, the signalling system there shown includes an interrogator 100 for developing a sequence of cyclically repeating pulsed interrogator signals differing in frequency and for receiving and decoding combinations of responder signals. The signalling system also includes a responder 102 which is responsive to the pulsed interrogator signals when the interrogator and the responder are within a selected minimum distance and which is operative to provide information in the form of selected combinations of responder signals.

Even though the signalling system may include one or more interrogators or one or more responders or both, the following description is limited to one interrogator and one responder, each of which is a separate structure and cooperates with the other. As will become more clear from the description below, cooperation between any interrogator and any responder takes place when the interrogator and the responder, which are in relative motion with respect to one another, approach one another so closely as to be within a selected minimum distance so that the power level of the signals to be exchanged is above a threshold level. During the time when the interrogator and the responder are within the selected minimum distance, the responder is said to be "operative to receive" the interrogator signals and develop a response thereto in the form of responder signals, and the interrogator is said to be "operative to receive" the responder signals and decode them. The term "operative to receive" as used hereinafter signifies the transfer of electric signals by means other than conventional conductors at a power level which is above a predetermined minimum threshold level. Such a transfer may be in the form of electromagnetic radiation or magnetic or electric coupling.

The portion of interrogator 100 which provides the interrogator signals, also referred to as the interrogator signal developing means, may include a plurality of conventional radio frequency oscillator means such as pulsed signal sources 104, 106 and 108, each having a sinusoidal output voltage of predetermined amplitude and a different frequency. A pulsed signal source, as is well known, is an oscillator which generates a signal frequency pulse as a result of an externally applied pulse. Even though only three signal sources are shown in FIG. 1, the actual number of signal sources utilized in a signalling system of the type here described depends on the total number of digits or bits required to provide identification of the various desired information from the responder. In practice, the number of signal sources may vary from a minimum of two to some maximum which number is henceforth designated by the letter $p$. The frequencies of the sinusoidal output voltages are likewise subject to wide limitation and are designated herein respectively as $F_1, F_2, \ldots F_p$. By way of example, a frequency range lying between 90 and 300 kilocycles per second has been found to perform very satisfactorily. The individual frequencies are selected so that none is harmonically related to another. Of course higher frequencies may be used even though in some applications of this signalling system the aforementioned range of frequencies is preferred because the higher the frequency the greater the attenuation due to ice, snow, etc.

The output voltages from signal sources 104, 106 and 108 are applied via individually adjustable attenuators 110, 112 and 114 to a variable gain device 116, which may include some automatic gain control means responsive to an automatic gain control difference voltage appearing on conductor 118. Device 116 may be utilized to control the amplitude of the various interrogator signals in accordance with the automatic gain control difference voltage. The purpose of providing automatic gain control and the method of developing the automatic gain control difference voltage will be explained below in connection with FIG. 3. Variable gain device 116 may take any of the forms well known to those skilled in the art, and which are sometimes referred to as variable gain attenuator or variable gain amplifier. One form of variable gain device suitable for automatic gain control as here contemplated is disclosed in detail in Jones Patent No. 2,910,579.

The output signals from variable gain device 116, designated as the amplitude controlled interrogator signals, may be suitably amplified, if desired, by amplifying means, such as a conventional power amplifier 120, to increase their power level sufficiently to facilitate the transfer of the interrogator signals from a transmit means 122 directly excited by the interrogator signals to responder 102. It is, of course, clear to those skilled in the art, that the position of variable gain device 116 need not be intermediate between signal sources 104, 106 and 108 and amplifier 120, but may be inserted instead between amplifier 120 and transmit means 122.

Transmit means 122 may take a variety of forms depending on the mode most suitable for transferring the interrogator signals to responder 102. This is merely another way of saying that there may be a preferred mode of making the interrogator "operative to receive." For example, the mode of transfer may be by inductive coupling as commonly used in transformers or by electromagnetic radiation as used in wave transmission or by electric coupling as used with capacitive devices. Each mode has certain advantages over the others as to particular applications and often a combination of modes may be utilized. For signalling systems utilized with railroads, the inductive coupling mode offers great advantages in that the physical dimensions of the transmit means and the pick-up means need not be so large as to require an electrical length of one-quarter or one-half of a wave length as required for the radiation mode. For inductive coupling, the transmit means may constitute a tuned circuit resonant at or near the frequency of the interrogator signal. Of course, a certain amount of energy even in a predominantly inductive coupling may be transferred by radiation.

For signalling systems utilized with air-borne aircrafts, the distance between the interrogators and responders is usually too great for effective inductive coupling and hence a predominating radiation mode of transfer is preferred. For a radiation transfer, the transmit means and receive means constitute antennas such as dipoles or loops which are effective radiators at the frequency of the interrogator signals. Even though the signalling system of this invention will herebelow be described with special emphasis on the inductive coupling mode of transferring signals from the interrogator to the responder and from the responder to the interrogator, it is to be expressly understood that such terms as "transmit means," "transfer," "receive means," "pick-up means" and others include transfer by electromagnetic waves and electric fields. The low frequency mode has been chosen only as an exemplary method because of its special adaptability to railroad operation.

Transmit means 122 may comprise either a parallel-tuned or a series-tuned inductance-capacitance network resonant at the center frequency of the frequency band including all the interrogator signals. The Q or selectivity of the network should be low enough so that the interrogator signals at the high and low frequency end of the frequency band are not unnecessarily attenuated relative to the center frequencies. For example, if a frequency band from 90 to 300 kilocycles per second is utilized as the interrogator signal frequency band, the Q of the coil usually should not exceed 5. Such a value of Q provides broad-band operation and simultaneously provides a reasonable value of gain. Each amplitude controlled interrogator signal will cause transmit means 122 to oscillate and thereby generate a field at the frequency of the interrogator signal to which responder 102 is responsive.

An audio frequency signal source such as 400 cycle master oscillator 124 may be utilized to drive a bistable switching device such as flip-flop circuit 126, also known as an Eccles-Jordan circuit or a bistable multivibrator. Impressing the output signal from oscillator 124 on circuit 126 causes output terminals "A" and "B" of circuit 126 to alternate between the "high" and "low" conditions at the 400 cycle repetition rate of oscillator 124. Terminal "B" of flip-flop 126 is connected to the input terminal, a modified ring counter 128 having a ring advance line 130. The term ring counter is well known to those skilled in the art and comprises a series of bistable multivibrators or trigger circuits connected in tandem to form a sequence-operated type of counting circuit. Ring counter 128 comprises as many stages as there are pulsed signal sources developing interrogator signals such as signal source 104. Each stage of ring counter 128 is connected to a different one of the pulsed signal sources 104, 106 and 108 and supplies the external pulse which turns on the signal sources. Whenever terminal "B" of flip-flop 126 becomes "high," ring counter 128 is advanced one position. As ring counter 128 advances one position, it turns off the signal source which has been oscillating and turns on the next signal source.

As will be explained in connection with the operation of the automatic gain control circuit, ring counter 128 is modified to the extent that each stage turns off its associated signal source before the ring advances to its next position. If automatic gain control is not utilized, the ring counter operates in the conventional way. If automatic gain control is utilized, it has been found desirable to turn off the associated signal source after about one-half of the time between ring advances has elapsed. This interval is utilized to insert an automatic gain control interrogator signal between each ring counter advance. As exemplary form of modified ring counter is fully described in the co-pending "Jones System" application. Of course, a series of monostable multivibrators connected in tandem to form a sequence-operated type of counting circuit may also be utilized wherein each stage or multivibrator provides a pulse having a time duration of approximately one-half of the signal frequency of master oscillator 124.

With a 400 cycle per second signal applied from oscillator 124 to flip-flop 126, it will be seen that there will be 200 "high" states and 200 "low" states at each of the output terminals of flip-flop 126 every second. Therefore each "high" state and each "low" state has a duration of 2500 microseconds. The "high" state from terminal "A" of flip-flop 126 will advance the ring position every 5000 microseconds so that each interrogator signal source will be operated or pulsed for a 5000 microsecond interval at a repetition of 200 divided by $p$ times a second, where $p$ is the number of signal sources of interrogator 100. If $p$ is selected as 5, for example, each interrogator signal source is repeated at the rate of 40 times a second. As has been indicated, when automatic gain control is utilized, the modified ring counter turns on the interrogator oscillator for only 2500 microseconds when the ring position is advanced, leaving the other 2500 microseconds, which coincide in time with terminal "B" being "high," for an automatic gain control interrogator signal.

The operation of the interrogator signal developing means is now easily understood. As master oscillator 124 impresses its output signal upon flip-flop 126, terminal "B" upon being "high" will advance the position of ring counter 128 to the next stage. This turns off the signal source that had been oscillating and developing a pulsed interrogator signal, say $F_1$, and turns on another signal source to develop another pulsed interrogator signal, say $F_2$. Each interrogator signal excites transmit means 120 for a short while. When automatic gain control operation is utilized, a signal source is turned off at the time when terminal "A" becomes "high." The combination of oscillator 124; flip-flop 126; ring counter 128; signal sources 104, 106 and 108; attenuators 110, 112 and 114; variable gain device 116, controlled by the voltage appearing on lead 118; amplifying means 120; and transmit means 122 provides an interrogator signal developing means including automatic gain control means responsive to an automatic gain control difference voltage which is operative to establish a sequence of pulsed interrogator signals differing in frequency, which sequence is cyclically repeated.

A frequency selective responder pick-up means 140 may include a plurality of pick-up elements 142, 144 and 146, each one of which is highly frequency selective and is "responsive to receive" only a selected interrogator signal. Non-selected interrogator signals do not operate upon a pick-up element. If transfer of the interrogator signals is contemplated by the radiation mode, receiving antennas of proper electrical dimension, or an antenna element coupled to a plurality of tuned circuits, are utilized. If the interrogator signals are transferred by inductive coupling, the individual pick-up elements 142, 144 and 146 may be parallel-tuned or series-tuned inductance-capacitance networks, each one being sharply tuned to the frequency of a different interrogator signal. If the selectivity, Q, of the individual tuned circuits is high, say about 100, then a frequency separation of several kilocycles from the resonance frequency in the range of the interrogators' signal frequencies will not induce any appreciable oscillation into the circuit. Of course, there are $p$ different pick-up coils, each one being associated (tuned) to a different interrogator signal frequency.

As is well known, a pair of inductors connected to opposite sides of an oscillating circuit provide a convenient method of utilizing the electrical energy stored in the oscillating circuit. The frequency of alternating current developed in such a pair of conductors (or conductor to ground if one conductor is grounded) is, of course, the same as that of the interrogator signal which provides the field to which the coil is coupled. For example, pick-up element 142, upon receipt of an interrogator signal of frequency $F_1$, commences oscillation (assuming responder and interrogator to be within the selected minimum distance) and develops an output signal, henceforth referred to as the response actuating signal, in conductor 148 which is connected to element 142. In this manner, responder pick-up means 140 provides a plurality of frequency selective responder pick-up elements, each sharply tuned to a different one of the frequencies of the interrogator signals, and each pick-up element being selectively operative to develop, from the interrogator signal to which it is tuned, a response-actuating signal.

A response-actuating signal developed by, say, element 142 may be impressed upon a rectifying means such as a conventional rectifier 150 connected to element 142 by conductor 148. Rectifier 150 may include a diode and a filter and provides conversion of the response-actuating signal from alternating current to a direct current. The rectified response-actuating signal is henceforth referred to as the response-actuating voltage. As will be elaborated upon hereinafter, the response-actuating voltage may be the sole power furnished to the responder 102. Rectifiers 152 and 154 are, respectively, connected to pick-up coils 144 and 146.

Each of the response-actuating voltages is utilized to power a selected plurality of responder signal oscillators of which only three are shown in block form and respectively designated by reference characters 156, 158 and 160. Each responder signal oscillator is operative to develop a responder signal of a different frequency in response to a response-actuating voltage. The actual number of different responder signal oscillators which may be incorporated in a given signalling system is $q$ and depends, among other things, on $p$, the number of different interrogator signals utilized and the total number of information coding which is desired. Each of the responder signals may be suitably designated by its frequency which is respectively $f_1, f_2 \ldots f_q$. The selected plurality of responder signal oscillators actuated by a single response-actuating voltage provides the simultaneous pulse coded signal.

A distribution network 162 is utilized to selectively connect the individual response-actuating voltages from rectifiers 150, 152 and 154 to the input terminal of responder signal oscillators 156, 158 and 160. More particularly, FIG. 1 shows distribution network 162 connecting rectifier 150 to oscillators 156 and 160; rectifier 152 to oscillators 156 and 160; and rectifier 154 to oscillators 156 and 158. It is therefore immediately apparent that one or more different responder oscillators are selectively connected to different sources of response-actuating voltages, and a different combination of responder signals may be obtained simultaneously from each source of response-actuating voltage. In some applications it has been found more convenient to incorporate the rectifying means directly into the diistribution network 162. FIG. 2a shows a structure wherein the rectifying means is incorporated into the distribution network.

Each individual responder signal may be impressed upon a responder transmit means 164 including the plurality of transmit elements 166, 168 and 170, each tuned to the frequency of its associated responder oscillator. The individual elements may take the form of either series-tuned or parallel-tuned inductance-capacitance networks for inductive coupling, or of suitable radiators if the radiation mode of transfer is adopted. The total number of responder transmit elements is equal to $q$, each oscillator having its own transmit element. Of course, the individual responder signals may, if so desired be connected to a single transmit means such as a broadly tuned circuit resonant at the center frequency of the frequency band of all responder signals or a suitable single radiator. However, individual sharply-tuned elements are preferred, since they provide greater gain.

The portion of interrogator 100 which receives and decodes the responder signals may be termed the interrogator receiver means and includes pick-up means 180 responsive to the individual responder signals. The physical embodiment of pick-up means depends again on the mode whereby the responder signals are transferred to the interrogator receiver means. For transfer by the radiation mode, a radiation antenna for receiving electromagnetic waves is, of course, required. If inductive coupling is utilized, as particularly applicable to railroad operation, a series-tuned or parallel-tuned inductance-capacitance network may be employed.

Pick-up means 180 may be selected as a tuned circuit, and is, preferably, broadly tuned to resonate at the center frequency of the responder signal frequency band. If desired, the single coil 180 may be replaced with a set of sharply-tuned coils in series with one another, each one resonating at a different responder signal frequency. Such an arrangement would increase the gain between the interrogator 100 and responder 102 at the expense of simplicity of pick-up means 180.

The signal developed by pick-up means 180 comprises, more often than not, several responder signals simultaneously, since most of the time a response-actuating voltage is impressed by distribution network 162 upon several of the responder signal oscillators. Since a responder signal is of a single frequency and the signal developed by pick-up means 180 may include a number of different frequencies, such a combination is referred to as a composite responder signal (which gives rise to the parallel pulse coded signal). In other words, a composite responder signal is a term applied to the combination of responder signals actuated by an element such as 142 upon receipt of its associated interrogator signal. It is therefore seen that a composite responder signal is developed by responder 102 upon the receipt of an interrogator signal from interrogator 100.

The composite responder signal may be applied to a receiving means such as a conventional receiver 182, so that the composite responder signal may be amplified to a desired power level. The amplified composite responder signal is then impressed upon a plurality of narrow bandpass frequency circuits or filters, of which three are shown, respectively designated by the reference characters 184, 186 and 188. The plurality of the frequency filters serves to separate or unscramble or decode the composite responder signal by removing therefrom the individual responder signals. It is, of course, evident that for each responder signal $f_1, f_2 \ldots f_q$, there must be an associated band-pass filter so that a total of $q$ filters are required. The designation shown inside the rectangles 184, 186 and 188 representing the filters indicates the center frequency of its pass band. The plurality of filters as such may be conveniently referred to as a responder filter means since it suppresses from any one filter output all responder signals except a selected one which it passes.

Each filter, such as 184, may be of conventional design and may comprise either a parallel-tuned or a series-tuned inductance-capacitance passive network, or, in certain instances, it may be desirable to utilize an active filter of the well-known type comprised of a feedback amplifier containing a twin T RC network in its feedback part. Each of the tuned circuits is resonant at a different one of the responder signals, and is operative to pass only a coding signal respresentative of the responder signal at the resonant frequency of the tuned circuit. The plurality of filters therefore may be seen to comprise the responder signal filter means responsive to the composite responder signal and operative to develop a separate coding signal for each of the selected plurality of responder signals included in the composite responder signal.

In some systems of the type here described, it may be desired to lower all frequencies of the received composite responder signal. This may be accomplished by utilizing a conventional beat frequency oscillator as part of or in conjunction with receiver 182 as is well known to those skilled in the art. The output from the beat frequency receiver would be a reduced frequency composite responder signal. The main advantage of a low frequency composite responder signal is that audio frequency instead of radio frequency filters may be utilized to separate the reduced frequency composite responder signal. Of course, if a beat frequency receiver is used, then the responder filter means would comprise audio filters.

It is desirable that all coding signals be of approximately equal magnitude so that greatest reliability of the signalling system is obtained. Providing interrogator signals of equal magnitude will not accomplish this since the path taken by each interrogator signal, and thereafter the responder signal which it activates, is inherently frequency sensitive. This inherent property may be compensated for by utilizing the individual attenuators 110, 112 and 114 which are set in such a manner that a particular code signal has the same magnitude irrespective of which of the interrogator signals it is actuated by. Additionally, each of the responder signal oscillators may include an adjustable attenuator to compensate for the different frequency responses due to differences in the frequencies of the different responder signals. These attenuators may be preset for each signalling system. If even greater accuracy is desired, the distribution net work 162 may be provided with attenuators to compensate in accordance with the number of responder signal oscillators actuated.

The output signal from each of the filters 184, 186 and 188 is, of course, an alternating current signal (code signal) of the frequency of the particular responder signal. It is sometimes desirable to rectify each of the alternating current signals to derive therefrom direct current voltages, referred to as coding voltages. For this purpose a rectifying means such as a plurality of associated rectifiers, designated respectively by reference characters 190, 192 and 194, may be utilized. In this manner, the individual associated rectifiers provide a rectifying means responsive to the coding signals and operative to develop coding voltages.

The coding voltages may be utilized in a variety of ways and represent, as the name suggests, a binary code indicating which ones of the $q$ different responder oscillators 156, 158 and 160 are actuated upon the receipt of a particular interrogator signal. It now will become apparent to those skilled in the art from the foregoing explanation that the number of responder signal oscillators $q$ determines, in part, how many different responders may be uniquely identified. For example, if a particular interrogator receiver means is equipped to decode or separate frequency-wise three code responder signals from the composite responder signal, a maximum of three responder signal oscillators may be utilized and only eight different combinations of coding voltages can be developed. If the interrogator provides only a single interrogator signal, only eight different responders can be uniquely identified. If an interrogator receiver means can separate or filter-out four different code responder signals, then a maximum of four responder signal oscillators may be utilized and 16 responders may be uniquely identified. As is well known, the maximum number of responders which may be uniquely identified is equal to 2 to the power $q$ where $q$ is, of course, an integer and represents the number of responder oscillators in a particular responder.

Interrogator 100, however, does not provide a single interrogator signal but rather $p$ different interrogator signals. Consequently, each of the interrogator signals can provide 2 to the power $q$ different combinations of coding voltages. For an interrogator-responder system in which the interrogator developes $p$ different interrogator signals and in which each responder may be equipped with the maximum of $q$ different responder signal oscillators, it is possible to get 2 to the power $pq$ different combinations of coding voltages as the interrogator signals execute one sequence. For example, for an interrogator having a sequence of 6 interrogator signals and responders using up to a maximum of 5 different response signal oscillators, the number of different responders which may be uniquely identified is equal to 2 to the power 30 minus 1, which is equal to 1,073,741,803.

The coding voltages from the rectifiers 190, 192 and 194, being a binary code, may be directly applied to the stages of a register means such as the code registers designated respectively by the reference characters 196, 198 and 200. Obviously the number of stages required for each of the registers 196, 198 and 200 is the same as the number of code responder signals which the interrogator receiver means can decode, each stage being associated with a different one of the responder signal oscillators which may be utilized. Consequently, each register accommodates a simultaneous pulse coded signal actuated by a single interrogator signal. Each stage of each register, such as 196, may be set either by the occurrence or the absence of the coding voltage from an associated rectifier.

It has been found convenient, for the purpose of the description of this invention, to separate the register means into different code registers, each having $q$ stages. Of course, in practice a single code register having $pq$ stages is utilized. In this representation, each code register is associated with a different interrogator signal and each stage is associated with a different responder signal. To make each of the $p$ code registers selectively responsive to the code voltages actuated by an associated interrogator signal, a plurality of gate or "AND" circuits, designated by reference character 202, are connected between the rectifiers 190, 192 and 194 and the $f_1$, $f_2$ and $f_q$ stages of the individual code registers. "AND" circuits such as 202 are well known in the art as 3-input "AND" circuits and may be defined as circuits having an output terminal and three input terminals, and are so designed that an output signal is provided when, and only when, a certain definite set of input conditions (the 3 input terminals simultaneously must be "high") are met.

Referring now more particularly to code register 196 and its associated "AND" circuit 202, it may be seen that stage 204 will be set only if an output signal is obtained from its associated "AND" circuit so that conductor 206 is "high." To obtain an output signal from "AND" circuit 202, it is necessary that three input signals be applied thereto, that is conductors 208, 209 and 210 must be "high." Conductor 210 is coupled to a multivibrator whose function is to be described later. Conductor 208 is coupled to a difference amplifier 212, whose function is also to be described later, and to rectifier 190, and is "high" whenever a responder signal of frequency $f_1$ is received. Conductor 209 is coupled directly to the stage of ring counter 128 which supplies the pulse to actuate signal oscillator 104.

It is therefore apparent that conductor 209 is only "high" when signal source 104 is oscillating since both are coupled to the same stage of ring counter 128. If conductor 210 is assumed to be "high" at the same time, "AND" circuit 202 will provide an output signal (conductor 206 being "high") as a responder signal of frequency $f_1$ is received. This output signal sets stage 204, which signifies that an interrogator signal of frequency $F_1$ has actuated a responder signal of frequency $f_1$. Conductor 209 provides a "high" input to all "AND" circuits whose output circuits are connected to the $q$ stages of register 196, which may also be referred to as the $F_1$ register. Similarly, each stage of ring counter 128 is connected to the "AND" circuits associated with a different one of the registers $F_2$, $F_3$ ... $F_p$. In this manner, a register means is provided which is responsive to a sequencing means and operative to set its stages in accordance with coding voltages received and the interrogator signals actuating the coding voltages.

If the coding voltage on lead 208 had been originated by, say, signal source 106, no output would appear on lead 206 since lead 208 would be "low."

It may be mentioned that it is not necessary to provide a register means having $pq$ stages. For example, a register having $q$ stages may be utilized in conjunction with a storage device which stores the binary numbers after receipt and provides a clearing pulse, and thereby prepares the $q$ stage register for receiving the next simultaneous pulse coded signal actuated by the next interrogator in the sequence. Additionally, the coding voltages may be directly applied to magnetic tape, punched tape or other well known storage means, obviating the need for code registers entirely.

It has been found that the reliability of the signalling system of this invention may be improved by applying the coding or digital voltages from rectifiers such as 190, 192 and 194 to the input circuits of a plurality of comparing means, each associated with a different responder signal such as the conventional difference amplifiers 212, 214 and 216, instead of directly to the "AND" circuits 202. Difference amplifiers are amplifiers having two input signals whose single output signal is a function of the difference between the two input signals. In this manner, the coding or digital voltages may first be compared with a reference voltage of a selected amplitude from a source 218 to make certain that the coding voltages have indeed originated from code responder signals instead of merely being noise or stray pick-up. Unless the magnitude of the individual coding voltage from a given rectifier is above a predetermined minimum level, indicating the presence of a responder signal and a desired degree of coupling between interrogator 100 and responder 102, its associated difference amplifier will not provide a coding voltage difference signal, and the stages, such as stage 204, will not be set erroneously by noise or stray pick-up signals. Reference voltage source 218 may, of course, include an adjustment means such as a potentiometer to provide an adjustable reference voltage so that the level at which a code reference signal provides a coding difference signal may be adjusted. The combination of the associated difference amplifiers 212, 214, 216 and reference voltage source 218 thereby provides a comparing means responsive to each of the coding voltages for comparing the magnitude of each of the coding voltages with a reference voltage and is operative to provide coding voltage difference signals.

Since interrogator 100 and responder 102 are capable of relative motion with respect to one another, the coupling between interrogator transmit means 122 and responder pick-up means 140 may increase from a small value during the approach to a maximum value when the relative distance therebetween is a minimum, and thereafter may decrease again as the two objects move apart in opposite directions. The same, of course, is true of the coupling between responder transmit means 164 and interrogator pick-up means 180. Since excitation of transmit means 122 remains constant, the power level of the response-actuating voltages developed at the input of distribution network 162 will change with the degree of coupling. The power level of the individual responder signals exciting transmit means 164 depends on the power level of the response-actuating voltages and consequently varies with the degree of coupling between transmit means 122 and pick-up means 114. Additionally, the power level of the composite responder signal developed by pick-up means 180 will depend on the power level of the individual responder signals exciting transmit means 164 and on the coupling between transmit means 164 and pick-up means 180.

It is therefore immediately apparent that during the time interrogator 100 and responder 102 are in close proximity with one another, the power level of the composite responder signal developed by pick-up means 180 undergoes a substantial change. This change of power level, unless corrected or compensated for, is directly reflected upon the magnitude of the individual coding voltages, and it is impossible to provide reference voltage level for the comparing means such as difference amplifier 212, to assure that the voltage from a rectifier, such as 190, is due to a code responder signal. The power level of the individual code responder signal developed at the output of the responder signal filter means, such as filter 184, is depicted by curve a, FIG. 3. Curve a, FIG. 3, is a plot of the relative power level of a code responder signal as passed by a filter of the responder signal filter means plotted against distance between interrogator 100 and responder 102.

By providing automatic gain control, the power applied to amplifier 120 may be controlled so that the output of each filter of the responder signal filter means remains nearly constant during the time interrogator 100 and responder 102 are in close proximity. Curve b, FIG. 3, depicts the power level of the code responder signals from the responder signal filter means when automatic gain control is provided. The substantially flat portion of curve b, FIG. 3, corresponds to the selected minimum distance. The advantages of automatic gain control should be obvious. Receiver 182 can be fully utilized without fear of saturation which might otherwise clip or distort the received responder signals. Also, the magnitude of the coding voltages from a rectifier, such as 190, will remain constant during the time which corresponds to the flat portion of curve b, FIG. 3, and which has been referred to as the selected minimum distance between the responder and the interrogator. In this manner, the reference voltage from source 218 may be set just a little below the level which corresponds to this flat portion, preventing a coding voltage difference signal except during the time when the automatic gain control is operative and hence insuring that the stage of a register such as 204 will not be set except under conditions of adequate signal strength.

Automatic gain control, to compensate for the variation in the coupling may be obtained by utilizing a signal source such as pulsed oscillator 230. Oscillator 230 is similar in all respects to a signal source, such as 104, and provides a signal at a frequency $F_{agc}$. A good choice for $F_{agc}$ is the center frequency of the frequency band containing the interrogator signals. Output terminal "A" of bistable trigger circuit 126 is connected to the oscillator 230 and consequently energizes it at the midpoint of the time interval between advances of the ring counter 128. It is for this reason that a modified ring counter is desirable so that no interrogator signal is developed during the time corresponding to the second time interval of the sequence when oscillator 230 is energized. The output signal of oscillator 230 is applied, via an adjustable attenuator 232, to variable gain device 116 to excite transmit means 122.

Frequency sensitive pick-up element 234 is included in pick-up means 140 and provides selective coupling to transmit means 122 when the latter is excited by a signal of the frequency of $F_{agc}$. The output of pick-up element 234 provides a response-actuating signal which, after rectification by rectifier 236, provides a response-actuating voltage for powering the automatic gain control responder signal oscillator 238. The output signal from automatic gain control responder signal oscillator 238 excites transmit element 240 of transmit means 164.

The automatic gain control responder signal is applied to receiver 182 as any other code responder signal, and is conducted thereafter via filter 242 to rectifier 244. Since it is desired to keep the output voltage of rectifier 244 constant during the approach of interrogator 100 and responder 102, this output voltage is impressed upon a difference amplifier 246 which compares it with a reference voltage of a selected amplitude from a reference voltage source such as 218. Unless a magnitude of the output voltage from receiver 244 is above a predetermined minimum level, indicating a desired degree of proximity between interrogator 100 and responder 102, the difference amplifier 246 will not provide an output voltage.

The output voltage from difference amplifier 246 is applied, via a filter 248, to lead 118 which controls variable gain device 116. As coupling between interrogator 100 and responder 102 increases, the signal on lead 118 will likewise increase and lower the gain of variable gain device 116 thereby keeping the output of rectifier 244 constant. The combination of difference amplifier 246, rectifier 244, reference voltage source 218 and filter 248 thereby provides a comparing means responsive to the rectified response voltage for comparing the rectified response voltage with a reference voltage and is operative to derive an automatic gain control difference signal.

As is easily seen, the level of reference voltage from source 218 determines how soon, during the approach of interrogator 100 and responder 102, the automatic gain control becomes operative; and how soon, as interrogator 100 and responder 102 move in opposite directions, the automatic gain control becomes inoperative. Of course, receiver 182 may be provided with an internal automatic volume control so that variable gain device 116 is allowed to work over a more limited range. Filter 248 is provided to smooth the output from difference amplifier 246 which increases and decreases each time that flip-flop circuit 126 changes its state. The reason for desiring a smooth automatic gain control difference voltage is obvious since otherwise variable gain device 116 would introduce perturbation.

As previously mentioned, the coding voltage difference signals from a difference amplifier, such as 212, may be directly applied to the stages of a register, such as 204, for recording either the presence or the absence of a particular code responder signal. It is therefore necessary that all stages of a register means, such as stage 204, be "clear" prior to the time of arrival of a coding voltage difference signal. In other words, when interrogator 100 and responder 102 approach one another, no record of a previous recorded binary bit should be present on the stages of the register means. For this purpose, an electrical clearing pulse may be applied to each of the stages of the register via buss bar 250 prior to or concurrent with the time at which interrogator 100 and responder 102 are within the selected minimum distance. This clearing pulse may be derived from the output of a register clearing means such as the conventional monostable multivibrator 252 upon being triggered by some control voltage. One suitable control voltage may be derived by utilizing the automatic gain control difference voltage as illustrated in FIG. 1, which rises sharply upon approach of the interrogator 100 and responder 102 and is therefore suitable as a trigger. Of course, any signal commensurate with a rectified responder signal is suitable. If the automatic gain control difference voltage is utilized to trigger the clearing pulse, the register means will be ready to receive coding voltage difference signals for storage when interrogator 100 and responder 102 are approaching the selected minimum distance.

It has been found that the reliability of the interrogator may still further be increased by including gating means preventing the setting of the stages of the register means unless automatic gain control is operative. As explained in connection with "AND" circuit 202, to insure that coding voltages actuated by a particular interrogator are set into the proper register of the register means, conductor 209 must be "high." Since "AND" circuit is a 3-input network, conductor 210 must also be "high." Conductor 210 provides the gating voltage and is connected to one output terminal of monostable multivibrator 252 which fires when interrogator 100 and responder 102 approach the selected minimum distance as explained in connection with the register clearing means. The output signal of monostable multivibrator 252 on conductor 210 is selected to provide a pulse with a time duration sufficiently long to permit several sequences of interrogator signals.

For the sake of simplification of the drawings, multivibrator 252 is shown having two output terminals, one of which is connected to buss bar 250 and the other to buss bar 210. Buss bar 210 in turn is connected to one input terminal of each of the "AND" circuits 202. In order for an output signal to appear, such as on lead 206, the following set of input conditions must be met simultaneously. First, a coding voltage must appear at the output terminal of rectifier 190 which is of sufficient magnitude to provide a difference signal so that difference amplifier 212 has an output voltage and conductor 208 is "high." Second, the coding voltage must have been actuated by signal source 104 so that a voltage pulse appears and lead 209 is "high." Third, the automatic gain control difference signal must be strong enough to indicate that interrogator 100 and responder 102 are within the selected minimum distance or else multivibrator 252 would not fire and provide an output pulse to make conductor 210 "high." It is therefore seen that the reliability of the signalling system is substantially increased and that stray pulses will not operate to erroneously set the stages of the various registers.

In interrogator 100 described hereinabove, difference amplifier 246 is utilized to provide the automaic gain control difference signal voltage and to fire multivibrator 252. It is to be understood, however, that such a dual function arrangement is shown only to retain simplicity of description and that separate difference amplifiers or a difference amplifier and other well known trigger sources may be substituted therefor. Likewise, multivibrator 252 is described as being suitable to simultaneously provide the short time duration clearing pulse to the register means and the long time duration gating pulse. As will be obvious to those skilled in the art, there may be certain advantages in utilizing separate multivibrators or perhaps other well-known trigger circuits to provide these pulses.

Additionally, suitable delay networks or differentiators may be incorporated in the various control means in accordance with well-known techniques to obtain desired time sequencing between the operation of automatic gain control, the clearing of the register means and the gating of the coding voltages. For example, it may be desirable to fire the multivibrator ahead of full automatic gain control operation to clear the register prior to the receipt of coding voltages and therefore utilize the rate of change of the automatic gain control difference voltage level rather than its quiescent level at full operation.

The description of FIG. 1 hereabove has been explanatory of one embodiment of the signalling system of this invention, whereby a binary code is set into a code register means when interrogator 100 and responder 102 are at a selected minimum distance from one another. The usefulness of the signalling system may be extended by providing a data link with each register means to transmit the binary number set into the register means to some centrally located agency so that the agency may be apprised at all times of the various information obtained.

If a binary number having $r$ digits is required to provide the necessary information with a signalling system of the type here described, a choice regarding the complexity of either unit may be made. As is immediately apparent, $r=pq$ and consequently the smaller $p$ or $q$, the lower will be the complexity of either the interrogator or the responder. For example, if $r$ is equal to 30 so that 1,073,741,823 different responders may be uniquely identified, $p$ may take any of the following values: 2, 3, 5, 6, 10, 15 keeping in mind that in the signalling system of this invention both $p$ and $q$ are integers. If the signalling system is to be utilized with a very fast moving system, a small value of $p$ is desirable. On the other hand, a small value of $p$ requires a large value of $q$ and consequently a complex responder. A good choice would be to make $p$ and $q$ approximately the same if the relative speed between the responder and the interrogator allows such a large value of $p$.

Referring now to FIGURE 2a, there is shown an illustrated embodiment of a responder constructed in accordance with this invention. Pick-up means, such as a plurality of tuned circuits, of which four are shown and respectively designated by reference characters 300, 302, 304 and 306, provide the individual frequency selective receiving elements. Actually, there are $p+1$ receiving elements, $p$ circuits are utilized for receiving the interrogator signals having frequencies $F_1, F_2 \ldots F_p$, and one circuit is utilized for the automatic gain control interrogator signal of frequency $F_{agc}$. Each of the tuned circuits may include an inductor and a capacitor designated respectively by reference characters L and C in tuned circuit 300. The impedance values of each combination of L and C are selected so that each of the tuned circuits is resonant at the frequency of a different interrogator signal. The resonance frequency of each of the tuned circuits is designated by the reference characters $F_1, F_2, F_3$ and $F_p$ in conformity with the convention adopted in connection with the description of FIG. 1. It is, of course, obvious to those skilled in the art that if a high frequency radiation mode of transfer is selected, common or separate antenna elements may be coupled to the tuned circuits. The antenna element thereby would receive a radiated interrogator signal and the individual tuned circuits may provide the required frequency selectivity.

If one of the tuned circuits receives an interrogator signal whose frequency corresponds to its resonant frequency, the tuned circuit will be set into oscillation causing the flow of an alternating current. A pair of leads, such as 308 and 310, coupled across tuned circuit 300 develop an alternating voltage therebetween which may be utilized to power selected responder oscillators. This alternating voltage is the response-actuating signal. Even though tuned circuit 300 is illustrated as a parallel-tuned circuit, it should be obvious that a series-tuned circuit may be substituted therefor. In this manner, the plurality of tuned circuits 300, 302, 304 and 306, or a combination of tuned circuits with one or more antenna elements coupled thereto, provides a pick-up means selectively responsive to interrogator signals and operative to develop response-actuating signals.

The response-actuating signal developed by each tuned circuit may be impressed upon a distribution network 312, having the form of a matrix and which includes means for rectifying the response-actuating signal to provide a direct current voltage which is the response-actuating voltage. The primary function of distribution network 312 is to distribute and impress the various response-actuating voltages developed by the frequency selective pick-up elements to selected groups or combinations of responder oscillators chosen from a plurality of responder oscillators designated respectively by reference characters 314, 316, 318 and 320. There are actually $q+1$ different responder oscillators, $q$ responder oscillators provide $q$ different responder signals utilized for coding and one oscillator is utilized to provide the automatic gain control responder signal. As explained hereinbefore, each responder oscillator is operative to develop a responder signal of a different frequency, which frequencies are respectively designated by the reference characters $f_1, f_2, f_3$ and $f_q$ in conformity with the convention adopted in connection with the description of FIG. 1. Utilization of a frequency band extending between 410 and 650 kilocycles per second has performed very satisfactorily as long as none of the responder signal frequencies is related harmonically to another or the interrogator signal frequencies.

Referring now to the operation of the responder, FIG. 2a, the receipt of an interrogator signal of frequency $F_1$ will set tuned circuit 300 into oscillation. The oscillations develop a response-actuating signal across leads 308 and 310. Lead 310 may be a common conductor which is tied to one terminal of each of the responder oscillators 314, 316, 318 and 320. Lead 308 is connected to the other terminal of responder oscillator 314 via diode X–1, to responder oscillator 316 via diode X–2, and responder oscillator 320 via diode X–3. A set of filters such as C–1, C–2 and C–3 is connected across responder oscillators 314, 316 and 320 respectively, so that the response-actuating signal is not only rectified but also smoothed. As soon as an interrogator signal of frequency $F_1$ is received, responder oscillators 314, 316 and 320 are energized, each one developing a responder signal having the frequencies $f_1$, $f_2$ and $f_q$ respectively. The combination of the responder signals having frequencies $f_1$, $f_2$ and $f_q$ provide what has herebefore been designated a composite responder signal which is a simultaneous pulse coded signal. This composite responder signal is associated with the interrogator signal of frequency $F_1$ since the latter actuated the former.

Similarly, tuned circuit 302 is connected by distribution network 312 via diodes X–4 and X–5 to responder oscillators 314 and 318. Upon the receipt of an interrogator signal of frequency $F_2$, a composite responder signal including responder signal of frequencies $f_1$ and $f_3$ is developed. Capacitor C–4 provides the filtering action for the response actuating voltage powering response oscillator 318. Tuned circuit 304 is connected by distribution network 312, which includes diodes X–6, X–7 and X–8 to responder oscillators 316, 318 and 320. Upon receipt of an interrogator signal of frequency $F_3$, the responder will provide a composite responder signal including responder signals of frequencies $f_2$, $f_3$ and $f_q$. Tuned circuit 306 is connected by distribution network 312 to responder oscillators 314 and 318 via the diodes X–9 and X–10. Upon receipt of an interrogator signal of frequency $F_p$, a composite responder signal, including the responder signal of frequencies $f_1$ and $f_3$ is developed.

Each of the composite responder signals represents a simultaneous pulse coded signal which is received and decoded by the interrogator receiver means of FIG. 1. Since the different interrogator signals, sequentially coupled to responder 102, actuate different composite responder signals, the sequence of composite responder signals is a successive pulse coded signal, each pulse of which is further simultaneous pulse coded. Upon receipt of a sequence of composite responder signals actuated by a sequence of interrogator signals, the receiver described in conjunction with FIG. 1 will operate upon the individual responder signals and develop output quantities for setting the individual stages of the code register means.

Each simultaneous pulse coded signal is decoded by the interrogator filter means (filters 184, 186 and 188, FIG. 1) to develop coding voltages. Further, each successive pulse coded signal (comprising the coding voltages) is gated so as to impress its individual output quantities, that is its coding voltages, upon the stages of a different register of the register means, FIG. 1. FIG. 2b illustrates a binary number which the responder shown in FIG. 2a would set into a code register means similar to the code register means of FIG 1. Each register is associated with a different interrogator signal as the frequency designation ($F_1$, $F_2$, $F_3$ and $F_p$) on top of a rectangle representing the code register signifies. Each responder signal is associated with a different stage of the various registers as the frequency designation ($f_1$, $f_2$, $f_3$, and $f_q$) below the square representing the different stages signifies.

FIG. 4 illustrates an embodiment of the responder signal oscillator such as the one designated by reference character 316 in FIG. 2a. A tank circuit including inductor 400 and capacitor 402 have their respective impedances selected to provide resonance at the responder signal frequency $f_2$. In addition to tank circuit $f_2$ the oscillator also includes a NPN or a PNP transistor 404, whose collector electrode is connected to one side of tank circuit $f_2$. The other side of tank circuit $f_2$ is connected to one terminal of an inductor 406 and to the output terminal 408. A parallel combination of the resistor 410 and the capacitor 412 is inserted between the other terminal of inductor 406 and the base electrode of transistor 414. Finally the emitter electrode provides the second input terminal 414 to the response signal oscillator. The circuit hereabove described is a transistorized version of the Hartley-type oscillator and is merely exemplary. Numerous different oscillators may be substituted therefor, as for example those shown in chapter 140, "Handbook of Semi-Conductor Electronics," Hunter, First Edition, 1956, McGraw-Hill, New York.

The remaining code oscillators 314, 318 and 320 may be similar in construction to the code signal oscillators shown in FIG. 4 except that each has a different resonant frequency (different tank circuit) as indicated by the $f$ symbol in the rectangle designating the oscillator.

It has been found convenient in some applications to utilize the tank circuit comprising inductor 400 and capacitor 402, FIG. 4, as one of the transmit elements of the responder. What has been said in conjunction with the tuned circuits 200, 302, 309 and 306, FIG. 2a, applies likewise to the tank circuits such as circuit $f_2$. If it is desired to transfer the responder signals to the interrogator by a mode different than inductive coupling an antenna element may be coupled to the oscillator tank circuit in the manner well known to those skilled in the art.

There has been described a signalling system wherein an interrogator transfers its sequence of different interrogator signals to a responder to actuate a response to each of the interrogator signals. The responder provides a simultaneous pulse coded signal to each of the interrogator signals including a maximum of $q$ frequencies. Each of the $q$ frequencies is utilized as a code digit or bit and may set the stages of a register. The sequence of interrogator signals provides a successive pulse coded signal, each pulse of which may be applied to a different register, each of which includes sufficient stages to accommodate the $q$ code digits.

What is claimed is:

1. A passive responder comprising: a plurality of pick-up elements, each pick-up element being selectively responsive to an interrogator signal of a different frequency; a plurality of oscillator means, each oscillator means being operative to develop a responder signal of a further different frequency when actuated, each of said pick-up elements being operative to develop sufficient electrical energy to actuate said oscillator means; and coupling means for coupling selected ones of said pick-up elements to selected ones of said plurality of oscillator means.

2. A passive responder comprising: a plurality of pick-up elements, each of said pick-up elements being responsive to an interrogator signal of a different selected frequency and having first and second output terminals; a plurality of oscillator means, each oscillator means being operative to develop a responder signal of a further different frequency and having a first and a second input terminal; a common conductor coupling said first output terminals to said first input terminals; a plurality of rectifying means for coupling selected ones of said second output terminals to selected ones of said second input terminals; and filter means coupled between said common conductor and the selected ones of said second input terminals.

3. A passive responder comprising: a plurality of pick-up elements, each pick-up element being selectively responsive to an interrogator signal of a different frequency and operative to develop a response-actuating signal therefrom; a plurality of oscillator means, each oscillator means being responsive to a response-actuating voltage and operative to develop a responder signal of a further different frequency; and a distribution network for coupling selected ones of said pick-up elements to selected ones of said oscillator means, said distribution network including rectifier means responsive to said response-actuating signals and operative to develop said response-actuating voltages.

4. Apparatus in accordance with claim 3 wherein each of said pick-up elements comprises a parallel-tuned inductance-capacitance circuit resonant at the frequency of a different one of said interrogator signals.

5. Apparatus in accordance with claim 3 wherein each of said oscillator means includes a parallel-tuned inductance-capacitance circuit resonant at the frequency of its associated responder signal.

6. A passive responder for developing a sequence of distinct simultaneous pulse coded signals characteristic of its identity in response to and solely powered by a successive pulse coded interrogator signal, each simultaneous pulse coded signal being associated with a different pulse of said successive pulse coded signal and all pulses being of a different frequency, said responder comprising: a plurality of frequency selective pick-up elements, each pick-up element being responsive to a different frequency pulse of said successive pulse coded signal; a plurality of responder signal oscillators, each of said oscillators being operative to develop a different pulse of said simultaneous pulse coded signal; and a distribution network means including rectifiers and filters, said distribution network means coupling selected ones of said pick-up elements to selected ones of said oscillators.

7. A passive responder for developing a sequence of simultaneous pulse coded signals in response to and solely powered by a sequence of pulsed interrogator signals differing in frequency, each simultaneous pulse coded signal being associated with a different one of said sequence of pulsed interrogator signals, said responder comprising: a pick-up means including a plurality of frequency selective elements, each element being responsive to a different one of said pulsed interrogator signals and operative to develop therefrom a response-actuating signal; a plurality of responder signal oscillators, each oscillator being responsive to a response-actuating voltage and operative to develop therefrom one of the pulses of said simultaneous pulse coded signal; and a distribution network including rectifier means and filter means for converting said response-actuating signals to said response-actuating voltages, said distribution network coupling selected ones of said frequency selective elements to selected ones of said responder signal oscillators, whereby each frequency selective element powers selected responder signal oscillators thereby providing one of said simultaneous pulse coded signals upon the reception of an associated interrogator signal.

8. A passive responder comprising: a plurality of frequency selective pick-up elements, each of said elements being responsive to a different one of a plurality of interrogator signals differing in frequency, each pick-up element being operative to develop a response-actuating signal upon the receipt of an interrogator signal to which it is responsive; a plurality of oscillator means, each oscillator means being operative to develop a responder signal of a further different frequency when a response-actuating signal is impressed thereon; and a passive distribution network for impressing selected ones of said response-actuating signals upon selected pluralities of said oscillator means.

9. An interrogator-responder apparatus comprising in combination: interrogator means operative to provide a plurality of pulsed interrogator signals of different frequencies, said interrogator signal developing means including a plurality of interrogator signal oscillators each responsive to a different cycling pulse and operative to provide thereupon one of said pulsed interrogator signals, said interrogator signal developing means also including cycling means operative to provide said different cycling pulses; and a passive responder selectively responsive to said pulsed interrogator signals and operative to provide selected simultaneous combinations of responder signals, each simultaneous combination of responder signals being provided by a different one of said interrogator signals, said responder including a plurality of tuned circuits each resonant at the frequency of a different interrogator signal, a plurality of circuit means, each circuit means being coupled to a different tuned circuit and forming a combination therewith which is operative to provide a response-actuating voltage upon the receipt of an interrogator signal which corresponds in frequency to the individual resonance frequency of said tuned circuit, and a plurality of responder oscillator means coupled to selected ones of said combinations and powered solely by said response-actuating voltages, each of said responder oscillator means providing one of said responder signals.

10. An interrogator responder signalling system comprising a plurality of interrogators and a plurality of passive responders, said interrogators and responders being capable of relative motion with respect to each other, each interrogator including a means for generating a cyclically repeating sequence of successive interrogator signals of different frequencies, each responder including means responsive to selected ones of said sequence of pulse interrogator signals when said responder and an interrogator move into spaced relation with each other, said responder including means for generating simultaneous pulse coded signals in response to the selected ones of said sequence of pulsed interrogator signals, said interrogator further including a receiver means for receiving the simultaneous pulse coded signals from the responder, said receiver means being operable to generate a separate output signal for each pulse of said simultaneous pulse coded signals.

11. An interrogator responder apparatus comprising interrogator means and a passive responder relatively movable into spaced relation with respect to each other, said interrogator means including a plurality of signal oscillators operable to sequentially generate a corresponding plurality of pulsed interrogator signals of different frequencies, said interrogator means further including a cycling means operative to provide sequential cycling pulses, said responded being selectively responsive to said pulsed interrogator signals and being operable to generate selected simultaneous combinations of responder signals, each simultaneous combination of responder signals being associated with a selected one of the interrogator signals, said responder further including a selected plurality of tuned circuits each resonant at the frequency of a corresponding one of the interrogator signals, a plurality of circuit means each coupled to each tuned circuit and operable to generate a response actuating voltage corresponding to a selected one of the received interrogator signals, said responder further including a plurality of responder oscillating means coupled to selected ones of the responder actuating voltages and operable to generate responder signals while being powered solely by the response actuating voltage, and said interrogator means further including a receiver responsive to the responder signals and operable to generate a separate output signal corresponding to each of the received responder signals.

12. A signalling system for identication of movable objects comprising a plurality of passive responders and at least one interrogator, said responders being relatively movable into spaced relation with the interrogator and being identifiable when within a selected minimum distance from the interrogator, said interrogator including means for generating a sequence of pulsed interrogator signals differing in frequency from each other, said interrogator further including means for cyclically repeating the sequence of pulsed signals, each responder including means responsive to selected ones of said sequence of interrogator signals and further means for generating a sequence of composite responder signals corresponding to the selected ones of the interrogator signals, said responder signals differing in frequency from each other and from the interrogator signals, said interrogator further including a receiver means coupled to said interrogator signal generating means and sequentially responsive to said composite responder signals for developing a separate output signal corresponding to each of the responder signals.

13. A signalling system in accordance with claim 12, wherein the interrogator further comprises a storage means including a plurality of storage elements each associated with a corresponding one of the pulsed interrogator signals, each storage element having a plurality of stages for passing a selected one of the responder signals, said interrogator further comprising a gating means responsive to said output signals and operable to sequentially couple the output signals to the corresponding one of the storage elements.

14. A signalling system for identifying movable objects comprising a plurality of passive responders and at least one interrogator, said responders being relatively movable into spaced relation with the interrogator, said interrogator including sequencing means for generating a cyclically repeating sequence of pulsed interrogator signals of different frequencies, said interrogator further including a primary induction means coupled to the interrogator signal generating means and excited by said pulsed interrogator signals and operable to generate alternating magnetic fields corresponding to the frequency of the pulsed signals, each responder including a plurality of secondary induction means each sharply tuned to a selected one of the frequencies of the alternating magnetic fields of the interrogator primary induction means, each secondary induction means being magnetically coupled to said interrogator primary induction means when said responder moves into spaced relation with the interrogator and being operable to generate a response actuating signal, each responder further including a plurality of responder oscillating means responsive to the response actuating signal for generating a single frequency responder signal of a further different frequency, each responder further including a responder primary induction means coupled to the oscillator means for generating an alternating magnetic field corresponding in frequency to the responder signal, each responder further including circuit means having rectifiers and filters for receiving said response actuating signals and for driving said oscillator means, said interrogator further including a secondary inductance means operable to be magnetically coupled with the responder primary inductance means for developing a composite responder signal, said interrogator further including receiver means coupled to the interrogator secondary inductance means for generating a separate output signal corresponding with each of the selected responder signals, said interrogator receiver means including a plurality of code registers corresponding to the plurality of interrogator signals, each code register having a plurality of stages corresponding to the selected responder signals and the output signals, said code registers being sequentially gated by said sequencing means whereby the stages of the code register are selectively set by the output signals derived from the composite responder signal.

15. A signalling system in accordance with claim 14 wherein the interrogator receiver means further comprises synchronizing means for sequentially coupling the output signals from the receiver means to the code register corresponding with the selected interrogator signal which actuates the output signal.

16. A signalling system in accordance with claim 14 wherein the interrogator further comprises means for generating a further pulsed interrogator signal of a frequency interposed between each of the other interrogator signals, and wherein each of the responders further comprises means selectively responsive to the further frequency and operable to generate therefrom a single responder signal of a still further frequency, said interrogator receiver means further including a control means coupled to receive the single responder signal, said interrogator receiver means further including a difference amplifier responsively coupled to said control means and operable to generate an automatic gain control voltage indicative of the degree of coupling between the responder and the interrogator, said automatic gain control voltage being coupled to control the amplitude of the pulsed interrogator signal.

References Cited in the file of this patent

UNITED STATES PATENTS

| | | |
|---|---|---|
| 1,476,003 | Martin | Dec. 4, 1923 |
| 1,786,805 | Wensley | Dec. 30, 1930 |
| 2,325,829 | Boswau | Aug. 3, 1943 |
| 2,483,445 | Talley | Oct. 4, 1949 |
| 2,542,825 | Mesa | Feb. 20, 1951 |
| 2,553,910 | Gaffney et al. | May 22, 1951 |
| 2,630,562 | Johnson | Mar. 3, 1953 |
| 2,673,292 | Treharne | Mar. 23, 1954 |
| 2,717,370 | Piper | Sept. 6, 1955 |
| 2,719,284 | Roberts et al. | Sept. 27, 1955 |
| 2,753,550 | Treharne | July 3, 1956 |
| 2,910,579 | Jones | Oct. 27, 1959 |